United States Patent [19]
Simmons

[11] 3,727,636
[45] Apr. 17, 1973

[54] FLOW CONTROL VALVE FOR FUEL INJECTION NOZZLE

[75] Inventor: Harold C. Simmons, Richmond Heights, Ohio

[73] Assignee: Parker-Hannifin Corporation, Cleveland, Ohio

[22] Filed: Jan. 25, 1971

[21] Appl. No.: 109,389

[52] U.S. Cl. .................137/541, 137/542, 239/410, 239/453
[51] Int. Cl. ..........................................F16k 17/04
[58] Field of Search..................137/471, 516.11, 137/540, 541, 542, 543, 543.13; 239/410, 453; 251/121

[56] References Cited

UNITED STATES PATENTS

| | | | |
|---|---|---|---|
| 2,263,197 | 11/1941 | Tabb et al. | 239/453 |
| 1,137,516 | 4/1915 | Moon | 137/543 X |
| 2,879,794 | 3/1959 | Costello | 137/542 |
| 1,206,359 | 12/1916 | Ohlsson | 239/453 |
| 2,574,120 | 11/1951 | Rich | 137/540 X |
| 2,753,217 | 7/1956 | Pecora et al. | 239/453 |
| 3,022,954 | 2/1962 | Davies et al. | 239/453 |
| 3,249,308 | 5/1966 | Cadiou | 239/453 |
| 3,568,711 | 3/1971 | Katz | 137/516.11 |
| 3,443,760 | 5/1969 | Simmons | 239/410 |

FOREIGN PATENTS OR APPLICATIONS

| | | | |
|---|---|---|---|
| 609,473 | 9/1960 | Italy | 239/453 |

Primary Examiner—Martin P. Schwadron
Assistant Examiner—David J. Zobkiw
Attorney—Oberlin, Maky, Donnelly & Renner

[57] ABSTRACT

A flow control (or metering) valve characterized in the provision of a combined pintle-spool type valve member in which the pintle valve portion cooperates with a large diameter seat in the housing so as to require large operating forces which, in turn, minimize the effects of friction and hysteresis losses and in which the adjacent spool valve portion is a close sliding fit in the housing bore and has one or more metering slots formed in its periphery to cooperate with the aforesaid seat to meter the flow through the valve with low gain owing to the metering area being independent of the spool size. The valve herein is further characterized in that the spool metering portion is of relatively short axial length and in that the valve member has an elongated small diameter guide portion which is guided in the housing at a zone spaced a substantial distance from the metering portion and seating portion so as to prevent cocking and sticking of the valve member despite the very close fit between the spool portion and housing bore and a relatively looser fit between the spaced guide portion of the valve member.

5 Claims, 1 Drawing Figure

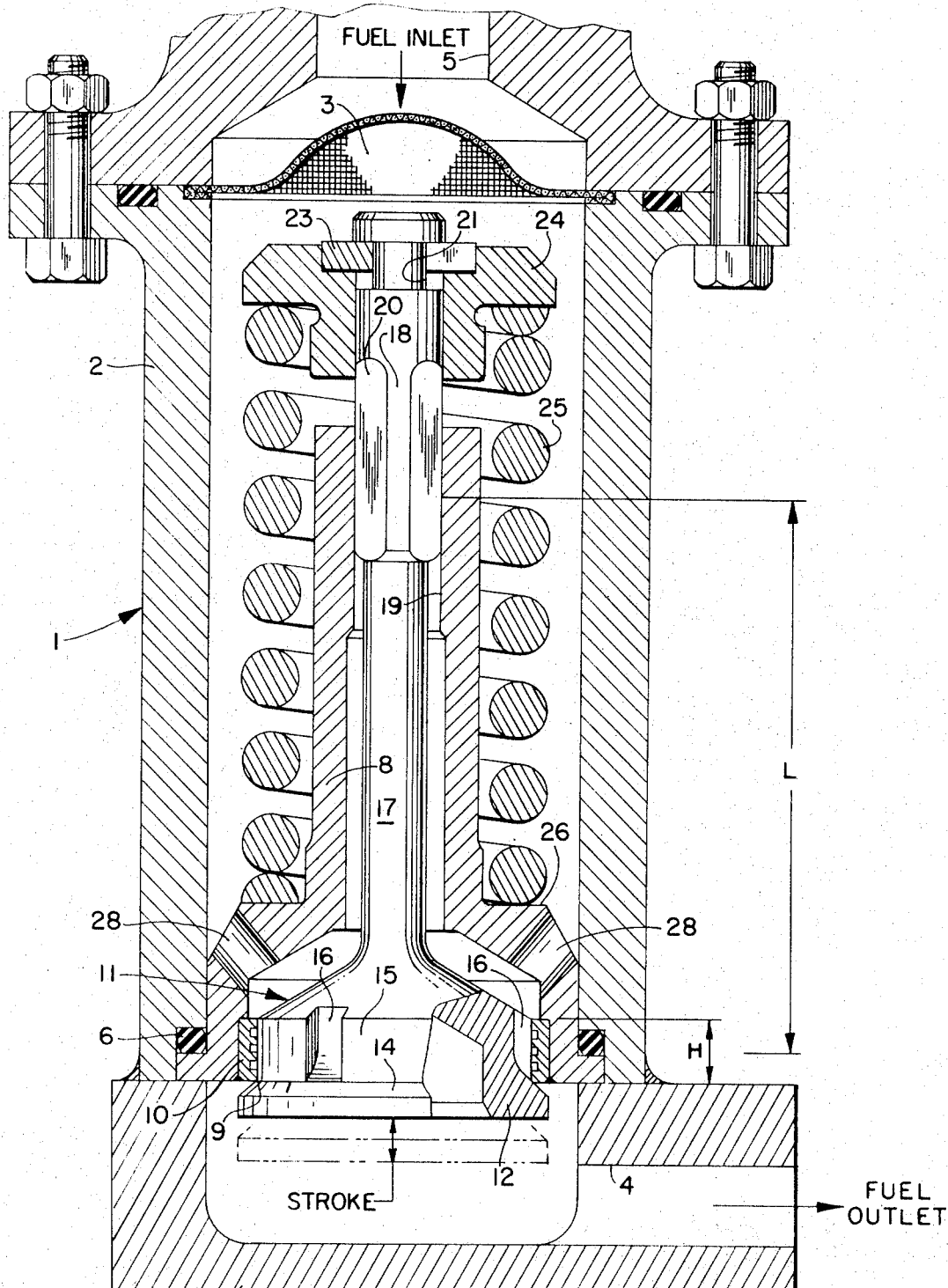

FLOW CONTROL VALVE FOR FUEL INJECTION NOZZLE

BACKGROUND OF THE INVENTION

Generally, flow control or metering valves for fuel injection nozzles and the like comprise pintle type valves which are of relatively small diameter having valve heads engaging seats of approximately the same diameter as the valve guide stems whereby relatively small operating forces are involved and thus hysteresis and friction losses are a significant factor, and moreover, the metering orifices are annular so that the radial width increases as the flow increases. See, for example, the patents to Davies No. 3,022,954, Simmons No. 3,042,317, Moebius et al. No. 3,159,971, and Simmons No. 3,443,760 for this type of variable area valve.

It is also known to provide variable area or flow metering valves wherein a piston type valve member progressively uncovers a metering slot in a surrounding sleeve member in the valve housing as shown, for example, in the Webster et al. U.S. Pat. No. 3,080,885, but such valves do not have a fully closed position owing to the sliding fit of the valve member in the sleeve member. Moreover, the chamber on the side of the valve member opposite to the pressure inlet must be communicated with the outlet port to enable inlet pressure to effect movement of the valve member to metering position. Accordingly, there is fluid leakage not only directly from the inlet to the outlet, but also from the inlet to the outlet via the aforesaid chamber so that there is a certain amount of flow of fluid through the valve even when the piston-like valve member is in a position covering the metering slot.

SUMMARY OF THE INVENTION

In contradistinction to known metering valves of the character referred to above, the metering valve according to the present invention is characterized in that it has a relatively large diameter valve head and a relatively short metering section which is a very close fit in the housing bore so that the fluid flow is confined to the metering slots whose flow area is independent of the diameter of the metering section, the axial length of the metering section, however, being comparable to that of much smaller diameter valve members so as yet to be sensitive to relatively small changes in pressure despite the large operating forces necessitated by the large diameter of the valve head and seat.

The metering valve herein also has a small diameter guide portion which has a small area of contact with the housing bore, and this, in combination with the relatively short axial length of the metering section, minimizes hysteresis and friction losses in relation to the large operating forces necessitated by the large diameter seat.

Other objects and advantages of the present invention will appear hereinafter.

BRIEF DESCRIPTION OF THE DRAWING

The single FIGURE herein is a central longitudinal cross-section view of a flow control valve embodying the present invention.

DETAILED DESCRIPTION OF THE DRAWING

The flow control or metering valve 1 herein comprises a housing 2 providing a screened inlet port 3 and an outlet port 4. When the valve 1 is employed to meter the flow of fuel to an injection nozzle, the fuel inlet port 3 will be communicated with the fuel manifold 5 and the fuel outlet port 4 will be communicated with the secondary orifice of a dual orifice injection nozzle, for example.

Sealed in the housing 2 by sealing ring 6 and retained in the housing 2 by the cap member 7 welded thereto is a valve guide and seat member 8 in which the seat 9 is formed in a hardened tubular member 10 welded or otherwise secured in said guide and seat member 8. The metering valve member 11 herein comprises a valve head 12 which has a frusto-conical surface 14 movable into and out of engagement with the seat 9 and an adjacent cylindrical metering section 15 which is a very close sliding fit in the bore of the seat member 10, and which is formed with one or more metering slots 16 in its periphery to progressively increase the rate of flow of fuel through the valve 1 as the valve member 11 moves downwardly away from the seat 9. The metering characteristics of the valve herein may be changed by changing the curvature of the bottom of each metering slot 16, by having the sides of each metering slot 16 diverge or converge upwardly instead of being parallel as herein shown, and also by changing the radii between the bottom and sides of each metering slot 16.

By way of illustrative example, the diametral clearance between the bore of the seating member 10 and the diameter of the metering section 15 may be 0.000050 inch with the interior of the seat member 10 being grooved as shown to minimize hysteresis effect and friction.

The metering valve member 11 has an elongated stem portion 17 which adjacent its upper end has a guide portion 18 guided in the bore 19 of the guide member 8. Because of the relatively great length L between the guide portion 18 and the metering portion 15 the diametral clearance between the stem and the bore may be on the order of 0.0003 inch and in addition, the guide portion 18 is relieved as at 20 to leave small areas of contact between the stem 17 and the bore 19, thus to minimize friction and hysteresis losses.

The upper end of the valve stem 17 has a peripheral groove 21 in which is disposed a C-washer 23 which is seated in a counterbore of a spring abutment member 24, the valve actuating spring 25 being compressed between the spring abutment member 24 and the abutment shoulder 26 of the guide member 8. As evident, the compression of the spring 25 may be adjusted by using a thinner or thicker C-washer 23 or shims thereunder or by shims at either or both spring abutment shoulders.

By reason of the large diameter of the seat 9 in relation to the area of the metering slot or slots 16, large operating forces are required to actuate the metering valve member 11 as compared with known metering valves wherein the seat diameter may correspond generally with the diameter of the guide bore. In the present case, the valve seat 9 diameter is more than three times the diameter of the guide bore 19 and thus the seat area is about ten times that which it would be if the seat diameter were approximately equal to the guide bore diameter. Thus, a very strong valve biasing spring 25 is required but yet the distance which the metering valve member 11 moves from zero flow to full flow is comparable to the distance which known variable area valves move from zero to full flow and therefore the hysteresis and frictional losses are minimal in proportion to the operating forces.

The valve guide arrangement at the upper end of the valve member may be termed a "knife edge bearing" which is very tolerant of dirt and contaminant in the fuel and therefore, the guiding function of portion 18 in bore 19 is not impaired by the presence of dirt or contaminants in the fuel which may pass the screen 27 at the fuel inlet port 3.

Since the ratio of the distance L to the metering section 15 engagement length H varies herein between about 10:1 (valve closed) and 40:1 (valve fully open), the binding action known as "dresser drawer effect" is eliminated providing that the diametral clearance of the knife edge bearing 18 is not more than about ten times the diametral clearance of the metering section 15. More generally, the condition is satisfied if the ratio of the diametral clearance of knife edge bearing 18 to the diametral clearance of the metering section is less than L/H.

In operation, as the fuel pressure at the inlet 3 increases and acts downwardly on the area of the seat 9 it will exceed the preload of the spring 25 to cause downward movement of the valve member 11 to expose a progressively increasing metering slot 16 area to meet the desired pressure drop versus flow rate characteristics. When the metering valve member 11 moves down, the flow of fuel is around the spring 25 and through the holes 28 in the guide member 8 and also through the spring 25 and the spaces between the flats 20 and guide bore 19 and the annular space around the valve stem 17. As the fuel pressure in inlet 3 decreases, the metering slot 16 area likewise will decrease and ultimately the valve head 12 will engage the seat 9 to shut off the metering valve 1 when the inlet pressure drops below the preload of the spring 25.

The metering valve 1 herein is especially suited for metering of fuel to the fuel injection nozzles of gas turbine engines and the like and the large dimensions of the valve head 12 make it possible to manufacture identical metering slots 16 while the low friction inherent in the bearing arrangement minimizes hysteresis losses and variations in calibration. In such use, the fuel metering valves 1 supply a number of individual fuel sprayer nozzles with identical amounts of fuel, this being commonly known as a flow dividing or flow distributing function.

I, therefore, particularly point out and distinctly claim as my invention:

1. A flow control valve comprising a housing having an inlet and an outlet and a passage for flow of fluid from said inlet to said outlet; guide means in said housing having axially spaced apart coaxial large and small diameter bores of which the former is several times larger than the latter; a valve member having axially spaced apart large and small portions axially guided in the respective bores; said large portion being of cylindrical form and having at least one peripheral axially extending groove which defines a variable area metering slot with said large bore as said valve member moves axially therein; said large portion being of diameter substantially equal to that of said large bore whereby fluid flows substantially solely through said variable area slot as the fluid pressure in said inlet increases or decreases; said small portion being guided in said small bore but having a greater diametral clearance therewith than said large portion has with said large bore; spring means biasing said valve member in a direction tending to decrease the flow area of said slot; said large portion being exposed to fluid pressure in said inlet thus to move said valve member in the opposite direction to increase the flow area of said slot as the force of the fluid pressure in said inlet on said large portion exceeds the biasing force exerted by said spring means, said large portion being of relatively short axial length in relation to the axial spacing of said large and small bores and said large and small portions from each other thus to prevent cocking and sticking of said valve member in said guide means despite such greater diametral clearance between said small portion and said small bore than between said large portion and said large bore.

2. The valve of claim 1 wherein said small portion is of non-circular cross-section to provide relatively small circumferentially spaced apart contact areas between said small portion and said small bore and to define flow passages between successive contact areas; and wherein said guide means has passages for fluid flow in addition to those between said small bore and said small portion.

3. The valve of claim 1 wherein said large portion has a further enlarged portion which is seated against the downstream edge of said large bore to prevent flow of fluid through said valve when the force of the fluid pressure in said inlet on said large portion is insufficient to overcome the force exerted on said valve member by said spring means.

4. The valve of claim 1 wherein said guide means adjacent to said large bore has an abutment shoulder; and said valve member adjacent to said small portion has an abutment member thereon; said spring means being compressed between said abutment shoulder and said abutment member.

5. The valve of claim 1 wherein the axial length of said large portion is a small minor fractional portion of the axial spacing of said large and small portions and wherein the diametral clearance between said large portion and said large bore is a small minor fractional portion of the diametral clearance between said small portion and said small bore whereby flow of fluid between said large portion and said large bore is substantially prevented except through said metering slot while the relatively larger diametral clearance and the axial spacing of said small and large portions prevents cocking and sticking of said valve member in said guide means by eliminating dresser drawer effect.

* * * * *